United States Patent [19]
Gee

[11] 3,952,391
[45] Apr. 27, 1976

[54] TURBINE BLADE WITH CONFIGURED STALK
[75] Inventor: Ted F. Gee, Greenwood, Ind.
[73] Assignee: General Motors Corporation, Detroit, Mich.
[22] Filed: July 22, 1974
[21] Appl. No.: 489,606

[52] U.S. Cl. .................. 29/156.8 R; 29/156.8 B; 416/2; 416/219 R; 415/9
[51] Int. Cl.² .................. B23P 15/00; B23P 15/02
[58] Field of Search .......... 416/2, 244, 219, 244 A; 415/9; 29/156.8 R, 156.8 B

[56] References Cited
UNITED STATES PATENTS

| | | |
|---|---|---|
| 2,493,461 | 1/1950 | MacConnell .................. 29/25.35 |
| 2,684,831 | 7/1954 | Grantham .................. 416/97 |
| 2,965,355 | 12/1960 | Spaeth .................. 416/219 |
| 2,985,426 | 5/1961 | Hunter et al. .................. 416/193 UX |
| 3,050,282 | 8/1962 | Allen et al. .................. 416/2 |
| 3,832,090 | 8/1974 | Matto .................. 416/95 |
| 3,858,290 | 1/1975 | Albani .................. 29/156.8 A |

FOREIGN PATENTS OR APPLICATIONS

| | | |
|---|---|---|
| 624,166 | 7/1961 | Canada .................. 416/2 |
| 24,621 | 2/1907 | Sweden .................. 416/2 |
| 609,446 | 9/1948 | United Kingdom .................. 416/244 A |

Primary Examiner—C. W. Lanham
Assistant Examiner—Dan C. Crane
Attorney, Agent, or Firm—J. C. Evans

[57] ABSTRACT

A turbine blade has a hole through the blade stalk and a controlled area in the stalk cross section on each side of the hole to assure that the blade will separate at the stalk upon over-speed of the turbine wheel. The hole is drilled and reamed and the hole surface is finally machined by chemical milling to eliminate stress risers while maintaining a controlled cross-sectional area to ensure that with selected wheel and blade materials, the blades will separate and reduce the speed of the turbine wheel.

1 Claim, 4 Drawing Figures

TURBINE BLADE WITH CONFIGURED STALK

The invention herein described was made in the course of work under a contract or subcontract thereunder with the Department of Defense.

This invention relates to overspeed protection systems for turbine engines having free turbine shafts and more particularly to power turbine systems having means for reducing the speed of a turbine when there is a sudden loss of load on the free turbine shaft.

Power turbine designs with a free turbine shaft connected to a load are driven by a turbine wheel powered by combustion products from a combustor assembly connected to a compressor discharge having a fuel supply directed thereto under the control of an overspeed fuel control protection system.

The exhaust from the combustor assembly is directed through a plurality of turbine stages which are coupled to either the compressor shaft or the free turbine shaft. A combined sudden loss of load on the free turbine shaft and a simultaneous malfunction of the fuel controlled overspeed protection system can result in an undesirable overspeed condition of a turbine wheel connected to the free turbine shaft. Various proposals have been suggested for limiting the stress condition in a turbine wheel to prevent the average tangential stress in the wheel from exceeding a predetermined level of the ultimate tensile strength of the wheel material. These approaches include having variable geometry power turbine vanes to block the gas flow path through the turbine wheel under overspeed conditions. It has also been proposed to provide predetermined weaknesses in the turbine rotor wheel that will selectively fail to produce a controlled containment of the turbine wheel within the engine housing.

The present invention is directed to an improved method for containing an overspeed condition in a turbine rotor wherein a third stage power turbine wheel connected to a free turbine shaft has a plurality of dove tail slots formed in its rim to receive a ring of turbine blades each having a dove tail root secured in the rim of the wheel and a stalk portion thereon located radially outwardly of the outer periphery of the wheel. Each blade further includes a base platform and a radially outwardly located platform to define a cross-sectional flow area through the ring of blades on the turbine wheel.

Blade and wheel materials are preselected to have relative strength under operating conditions such that critical blade sections will separate prior to wheel stress buildup. The critical section is defined at the stalk of each of the blades. It has four sides thereon all machined to a closely controlled cross-sectional area and each of the stalks has a hole directed therethrough longitudinally to provide a closely controlled reduced section for predicting blade separation probability.

Under sudden loss of load that produces an uncontrolled overspeed of the free turbine shaft, the hole and controlled cross-sectional area in the stalk are selected to assure that all of the third stage blades will separate prior to the average tangential stress of the turbine wheels exceeding 0.9 of the ultimate tensile strength therein.

This method produces a confidence level in excess of 99.999 percent that at least 60 percent of the blades in the third stage turbine wheel will separate to reduce wheel speed before the ultimate tensile strength is reached in the turbine wheel.

Accordingly, an object of the present invention is to provide an improved method for preventing excessive buildup of the average tangential stress in a turbine wheel connected to a free turbine shaft by selecting a turbine rotor blade having a stalk thereon located between the root section of the blade and the blade surface subjected to exhaust flow and directing a longitudinal hole therethrough; the stalk machining all four sides of the blade stalk to a closely controlled cross-sectional area at the longitudinal hole in order to define a closely controlled reduced section for predicting blade separation probability; and selecting blades and turbine wheel material properties so that all of the third stage blades will separate at the longitudinal hole before the turbine wheel reaches an average tangential stress that exceeds 0.9 of the ultimate tensile strength of the material properties of the wheel; the critical section in the blades being sized to assure separation of the blades in order to prevent over stress of the wheel under conditions where the blade material strength is a +1.5 standard deviations from the mean ultimate tensile strength under operating conditions and the wheel material strength is a −3.3 standard deviations from the mean ultimate tensile strength under operating conditions.

Another object of the present invention is to provide an improved turbine wheel construction for association with a free turbine shaft connected to a load and subject to overspeed operation upon a sudden loss of load on the shaft by the provision of a turbine wheel having a disc portion thereon fixedly secured for rotation with the free shaft and a rim having a plurality of dove tail retainer slots formed therein for supporting a ring of rotor blades in an exhaust passage from a turbine engine and wherein each of the turbine blades includes a root portion with a dove tail configuration seated in one of the slots and a stalk located radially outwardly of the wheel rim with four carefully machined sides and a hole directed therethrough longitudinally of the root slot to define a closely controlled critical cross-sectional area, each of the blades including a radially inwardly directed platform and a radially outwardly directed platform to define the gas flow passage across the ring of blades, each of the blades being secured to the rotor by means of retainer plates snap fit therebetween and wherein the longitudinal hole in each of the blades is designed to assure blade separation under over-speed operating conditions and reduction of wheel speed prior to undesirable tangential stress buildup in the wheel rim.

Still another object of the present invention is to provide an improved turbine wheel assembly for association with a free turbine shaft subject to overspeed operation upon the sudden loss of load wherein the turbine includes a wheel portion having an outer peripheral rim thereon with a plurality of circumferentially located retainer slots of dove tail form to receive a ring of turbine blades each having a root portion with a dove tail configuration fit in one of the slots and a base platform and a radially outer tip platform cooperating with those on adjacent blades to define a flow path through the turbine stage and wherein each of the blades includes a stalk located radially outwardly of the peripheral rim of the wheel and radially inwardly of the gas flow path through the blades having a hole directed therethrough longitudinally of the stalk to define a critical cross section in each of the blades that is finally machined by chemical milling to eliminate any stress risers to define a critical blade section which, with selected wheel and blade materials, will ensure that the blades will separate from the rim to reduce the speed of the free turbine shaft under lost load conditions to prevent undesirable tangential stress buildup in the turbine wheel rim.

Further objects and advantages of the present invention will be apparent from the following description, reference being had to the accompanying drawings wherein a preferred embodiment of the present invention is clearly shown.

Figure 1:
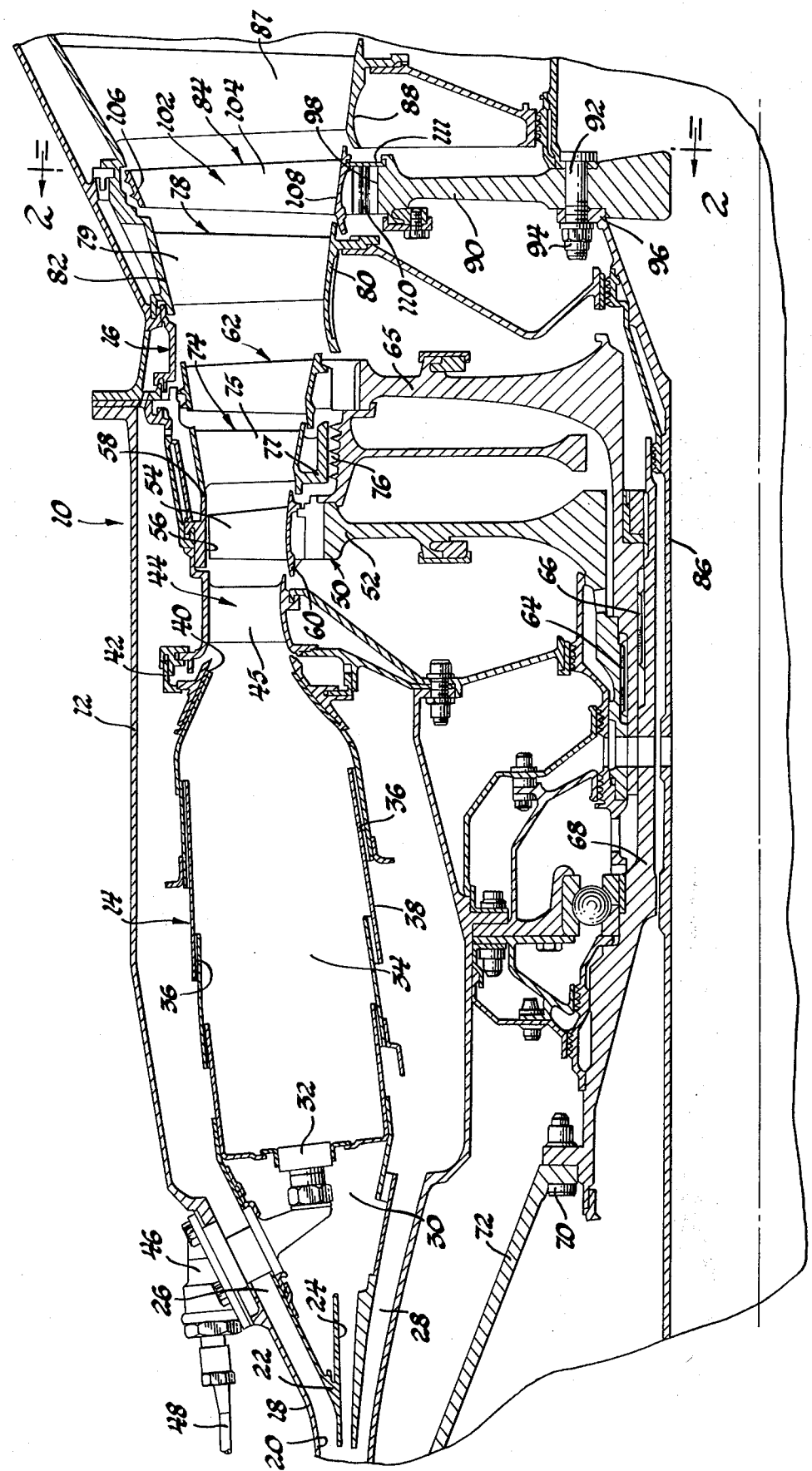
FIG. 1 is a longitudinal cross-sectional view of turbine engine stages including the present invention.
Figure 2:
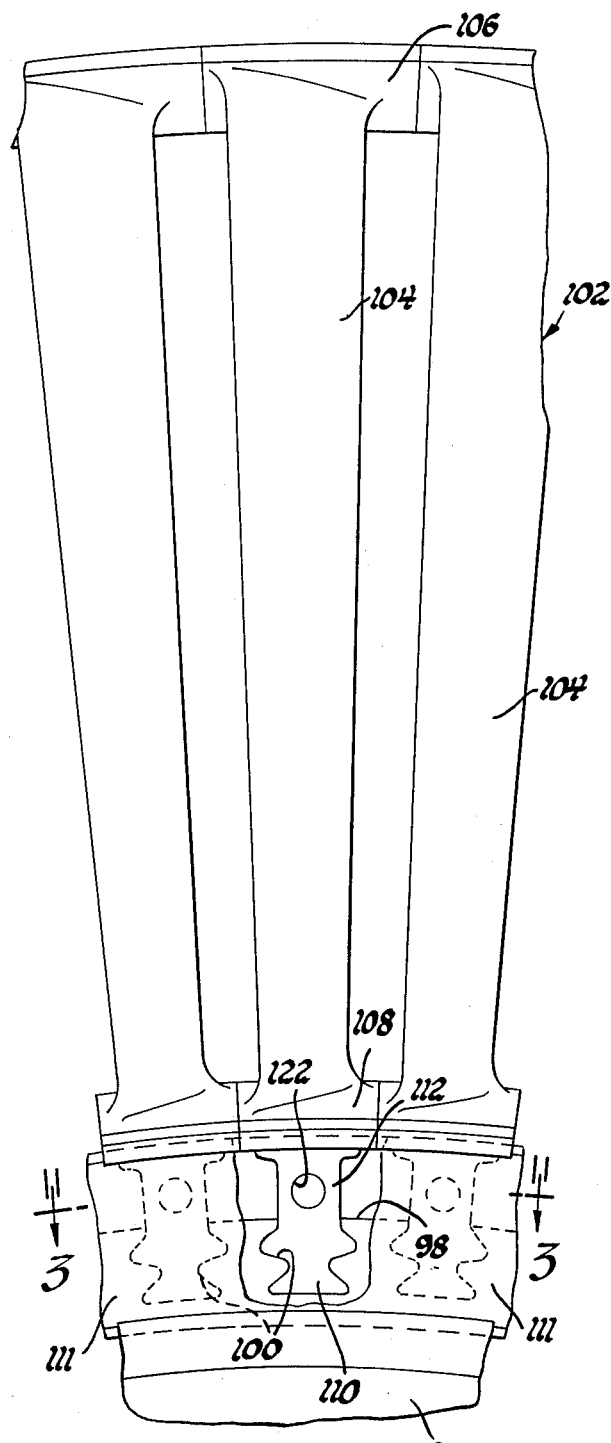
FIG. 2 is a fragmentary enlarged end elevational view taken along the line 2—2 of FIG. 1, looking in the direction of the arrows, partially broken away to show a dove tail root slot and root configuration for use in association with the present invention.

Referring now to FIG. 1, a power turbine 10 is illustrated including an outer housing 12 in surrounding relationship to a combustor assembly 14 and a plurality of turbine stages 16 supplied by the combustor assembly for powering the engine.

More particularly, the power turbine 10 includes a housing portion 18 defining a discharge passage 20 from an inlet compressor with multiple stages (not shown). A flow director member 22 in passage 20 defines a primary inlet air passage 24 to the combustor assembly 14 and separates secondary air passages 26, 28. The primary air passage 24 communicates with a plenum 30 upstream of a primary fuel supply nozzle 32 for directing air and fuel into a combustion chamber 34 within the assembly 14. Secondary air is directed from the passages 26, 28 through louvered openings 36 in the wall 38 of the combustor assembly 14. The wall 38 defines an annular discharge opening 40 from the combustor assembly 14 connected by means of a support ring 42 with respect to the inlet end of a first stage turbine nozzle 44 having a ring of vanes 45 therein for directing combustion products through the plurality of turbine stages 16.

In the illustrated embodiment of the invention, the primary fuel nozzle 32 is communicated by a fitting 46 and a fuel line 48 to an overspeed fuel flow protector system of the type more specifically set forth in the U.S. Pat. No. 3,309,868 to N. L. Downing et al., issued Mar. 21, 1967.

The plurality of turbine stages includes a first turbine stage 50 including a turbine wheel 52 having a ring of circumferentially located blades 54 thereon located within an exhaust passage 56 formed by an outer shroud 58 and an inner shroud 60 defined by a plurality of circumferentially located platforms on each of the blades 54. The rotor wheel 52 is connected to a second turbine stage 62 by means of a spline connection 64. A second stage turbine wheel 65 is connected by means of a spline connection 66 to an annular support member 68 coupled by means of a ring of bolts and lock nuts 70 to a compressor shaft 72. Accordingly, the first and second turbine stages 50, 62 are utilized to power a compressor that represents a load thereon for limiting the speed of shaft 72.

In the illustrated arrangement, the plurality of turbine stages includes a second stage nozzle 74 with a ring of vanes 75 supported on the shroud 58 between the first turbine stage 50 and the second turbine stage 62. A labyrinth seal assembly 76 is supportingly received by the first and second turbine stages 50, 62 for relative rotation with respect to the inner shroud 77 of the nozzle stage 74 for sealing between the first and second stages.

A third stage nozzle 78 is located downstream of the gas generator turbine second stage 62. It includes a plurality of flow directing vanes 79 located circumferentially around a radially inwardly located shroud member 80 and a radially outwardly located shroud member 82 to define the inlet to a third turbine stage 84 that is connected to a free turbine shaft 86 of the type having a load thereon that can be suddenly removed from the third stage turbine 84 to cause an undesirable speed increase therein. A ring of diffuser vanes 87 are supported between the outer shroud 82 and a radially inwardly located shroud 88 to define a discharge exhaust passage from the turbine stage 84.

The present invention is predicated on the requirement that high speed turbine components be contained within the outer casing 12 in the case of a combined sudden loss of load and a simultaneous malfunction of the fuel control over speed protection system.

Third stage rotor speed transient conditions under a sudden loss of load on the free turbine shaft 86 produces a power turbine speed at the third stage which can reach 145 percent of the operating speed before speed reduction occurs. Accordingly, the design of the third stage turbine 84 is based on a rate of separation of a critical element therein of 1-in-1,000 at 150 percent of operating speed with the material strength property in the critical element under operating conditions, of minus 3 standard deviations from the ultimate tensile strength. In the illustrated arrangement, the third stage turbine is operated in the range of 11,500 RPM so that the assumed design speed is 17,250 RPM.

Figure 3:
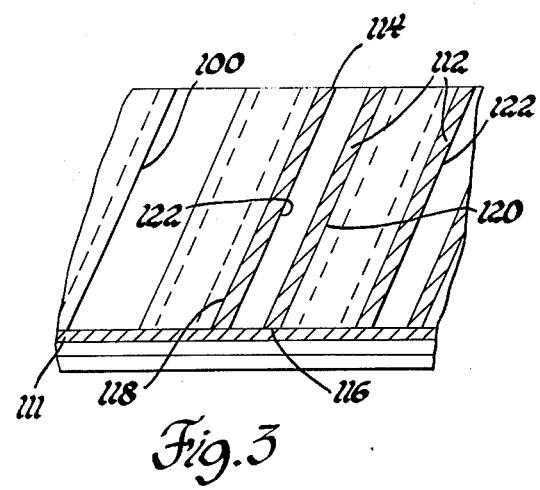
FIG. 3 is an enlarged fragmentary sectional view taken along the line 3—3 of FIG. 2.

In accordance with the present invention, the third stage turbine 84 includes a turbine wheel 90 connected by means of a ring of bolts 92 and lock nuts 94 to an annular end flange 96 of the free turbine shaft 86. The turbine wheel 90 is a high tensile strength material. The turbine wheel 90 includes an outer peripheral rim 98 having a plurality of circumferentially spaced dovetail grooved slots 100 therein each inclined with respect to the axis of the free shaft 86 as best seen in FIG. 3. The third stage turbine 84 further includes a ring of turbine blades 102 located within the exhaust passageway 56 downstream of the third stage nozzle 78. The ring is made up of a plurality of circumferentially spaced blades 104 each having a radially outwardly located platform 106 for defining an outer shroud for the third stage turbine 84 and each further including a radially inwardly located platform 108 located radially outwardly of the outer peripheral rim 98 of the turbine wheel 90 so as to define an inner shroud for the exhaust flow passage through the third stage turbine 84.

Additionally, each one of the third stage blades 104 includes a dovetail configured root 110 thereon slidably fit in one of the dovetail slots 100 and a retainer ring 111 secures each of the blades 104 on the turbine wheel 90. In FIG. 3 one of the roots is omitted to illustrate the configuration of slot 100. In accordance with the present invention, each of the blades further includes a stalk 112 thereon formed radially outwardly of the outer peripheral rim 98 of the turbine wheel 90 and extending to the radially inwardly located platform 108 on each of the blades. As best seen in FIG. 3, each of the stalk portions includes a front surface 114 and a rear surface 116 thereon located in spaced parallelism with the front surface 114. Additionally, each stalk portion 112 includes spaced parallel sidewalls 118, 120. The front and rear surfaces 114, 116 and the sidewalls 118, 120 are machined to a closely controlled cross-sectional area and a longitudinal hole 122 is drilled therethrough along the longitudinal axis of the dovetail slot 100. The longitudinal hole 122 therethrough is then subjected to a chemical milling process which includes the following steps.

The surface of the hole 122 is electrochemically machined by use of a NaCl electrolyte of a 1.030 specific gravity at a temperature of 90°F. and a voltage of 8 volts. If the hole is straight, the flow of electrolyte is applied through a 12–14 second dwell period from one direction through the hole 122. Then the flow is reversed and the electrolyte is run through the hole for another 12–14 second dwell period. If the hole is tapered more than 0.003 inches from ene-to-end, the electrolyte is flowed from the small diameter end of the hole for a dwell period of 22–25 seconds without subsequent flow reversal or additional dwell period. The final machining by chemical milling eliminates any stress risers at the critical section defined by the machined front, rear and sidewalls and the longitudinal hole 122. Given the closely controlled cross section in a stalk section located radially outwardly of the wheel, a critical section is determined that can be used to accurately predict blade separation probability.

In order to assure that all third stage turbine blades will separate at the critical cross section in the stalk portion 112 prior to a wheel burst, the design is based on blades with as high as a plus 1.5 standard deviations material properties and wheels with material properties as low as a minus 3.3 standard deviations from the average ultimate tensile strength under operating conditions. Wheel burst is defined to occur at 9/10 of the ultimate tensile strength.

In a multi-stage turbine the wheels and blades of other stages have material properties which exceed the selected minimum value of the controlled stage. In the illustrated embodiment the third stage is the selected control stage and all other stages coupled to the free shaft 86 have material properties which exceed those of the third stage wheel and blade materials.

Figure 4:
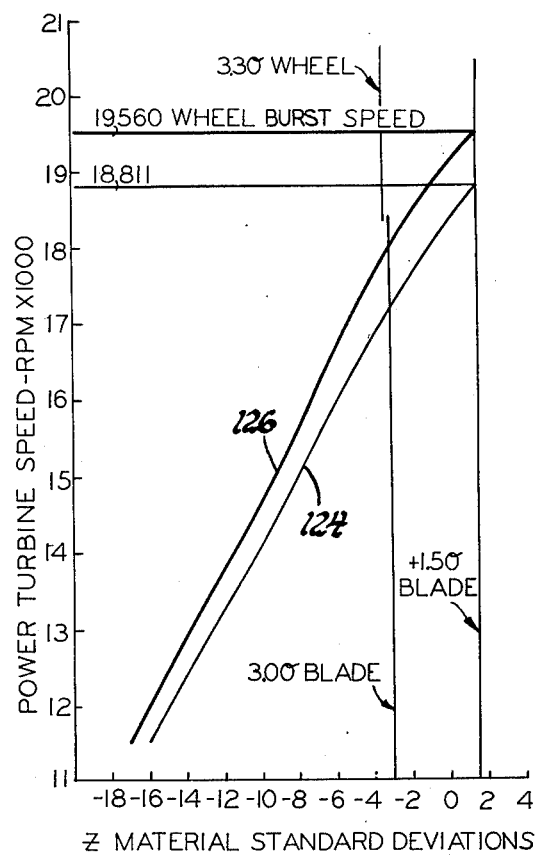
FIG. 4 is a graph showing power turbine speeds attainable with predetermined critical blade stalk sections and preselected wheel and blade strengths.

In the chart of FIG. 4, power turbine speed is plotted as a function of the blade 104 or the turbine wheel 90 as represented by a number of standard deviations from the mean value of the material properties of each of the blades 104 and the turbine wheel 90 under operating conditions. As shown in FIG. 4, a minimum tolerance blade 104 is designed to satisfy a 3 standard deviation reduction in strength requirement at the design speed of 150 percent; 17,250 RPM in the illustrated embodiment. Of course, a maximum tolerance blade is capable of more overspeed at the same risk of separation. The third stage turbine blade of minimum stalk area is represented by the curve 124 in FIG. 4 and a maximum tolerance blade is represented by the curve 126 in FIG. 4. The slope of each of the design lines 124, 126 is a function of the material properties of the blade. As can be seen in FIG. 4, the minimum stalk area blade represented by the curve 124 will intersect the 1.5 standard deviation line at 18,811 RPM as shown while the maximum stalk area blade represented by the line 126 will reach the same probability of separation at 19,560 RPM. At the higher speed of predictable separation, the average tangential stress in the wheel is designed to be below 0.9 of ultimate tensile strength with reduction in the wheel of 3.3 standard deviations from its average ultimate tensile strength. In view of the aforesaid selection of wheel and blade materials and the provision of a critically controlled cross section of the type show, it can be predicted that at least sixty percent of blades will separate at or before the average tangential stress of a wheel using material properties reduced by 3.3 standard deviations reaches 0.9 of the ultimate tensile strength of the wheel and thereby reduce wheel speed. This selected criteria based on the probability of a given blade developing material strength greater than 1.5 standard deviation properties in its wheel developing material properties less than 3.3 standard deviations is 1-in-30,000. This combination; namely, selecting a blade that will have a separation at the critical element of 1-in-1,000 and the preselection of materials to produce a probability of the strength buildup and strength reduction in the blade vis-a-vis the wheel being 1-in-30,000 produces a combination that gives a 99.999 percent confidence level that at least 60 percent of the blades in a given wheel will separate at or below the occurrence of an undesirable tangential stress in the wheel. Such separation of the blades will reduce the overspeed conditions in the unloaded free shaft 86 and will result in an operating mode that is easily contained within the outer casing 12 of the engine 10 and which will assure that the structural integrity of the turbine wheel 62 will be maintained. Repair can be made by replacing blades that have separated at the critical cross section formed by the carefully controlled cross-sectional area in the stalk section along with the longitudinally chemically machined opening therethrough.

The plot shown in FIG. 4, as previously stated includes blade stalk area slope lines 124, 126 each having a slope that is a function of the blade material. The design was established starting at an assumed reduction in the strength of the blade material of three standard deviations and 17,250 RPM using a minimum tolerance blade as shown by the curve 126. Since the stress in the wheel must not exceed 0.9 ultimate tensile strentgh, the design curve 124 intersects the 1.5 standard deviation line at 18,811 RPM. In order to properly design the wheel, a maximum tolerance blade represented by the curve 126 was used to locate the intersection with the 1.5 deviation strength buildup line at 19,560 RPM which represents a wheel design speed at which 3.3 standard deviation material reduction properties of the wheel are applied to give a desired combination of blade and wheel probability of the type set forth above.

While the embodiments of the present invention, as herein disclosed, constitute a preferred form, it is to be understood that other forms might be adopted.

What is claimed is:

1. A method for preventing average tangential stress buildup in a gas turbine engine rotor wheel having a ring of turbine blades supported thereon each having a dovetail configured root fit in a dovetail blade slot in the peripheral rim of the wheel and wherein each blade includes a stalk portion with end walls and parallel side walls comprising the steps of selecting a blade material having a high tensile strength and with material strength development under operating conditions not to exceed 1.5 standard deviations from a statistical mean strength, selecting a rotor wheel material having a high tensile strength and with material strength reduction not to exceed 3.3 standard deviations from a statistical mean strength, machining all peripheral walls of said stalk to establish a controlled rectangular area therethrough, drilling and reaming a circular hole through said stalk area with an inner surface parallel to and bounded by the side walls, chemically machining said hole surface to eliminate stress risers therein thereby to define a critical separation section, and locating the stalk at a point radially outwardly of the rim so that the pre-treated hole and bounding parallel side walls of said stalk are unsupported therein to assure that at least 60 percent of the blades will separate at the hole prior to the average tangential stress of said wheel reaching 90 percent of the ultimate tensile strength of said wheel with the blade separation serving to reduce the speed of the wheel.

* * * * *